US011394187B2

(12) United States Patent
Tashiro et al.

(10) Patent No.: US 11,394,187 B2
(45) Date of Patent: Jul. 19, 2022

(54) ELECTRIC CONNECTION BOX AND WIRE HARNESS

(71) Applicant: Yazaki Corporation, Tokyo (JP)

(72) Inventors: Hiroki Tashiro, Shizuoka (JP); Ryouichi Yokoyama, Shizuoka (JP); Atsushi Sumida, Shizuoka (JP); Junya Masuda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 129 days.

(21) Appl. No.: 17/102,466

(22) Filed: Nov. 24, 2020

(65) Prior Publication Data
US 2021/0175697 A1    Jun. 10, 2021

(30) Foreign Application Priority Data

Dec. 5, 2019    (JP) .............................. JP2019-220115

(51) Int. Cl.
| | |
|---|---|
| *H01R 11/01* | (2006.01) |
| *H02G 3/08* | (2006.01) |
| *B60R 16/02* | (2006.01) |

(52) U.S. Cl.
CPC ......... *H02G 3/086* (2013.01); *B60R 16/0215* (2013.01); *H02G 3/083* (2013.01); *H01R 11/01* (2013.01)

(58) Field of Classification Search
CPC .... H02G 3/086; H02G 3/083; B60R 16/0215; H01R 11/01
USPC ....................................................... 174/549
See application file for complete search history.

(56) References Cited

U.S. PATENT DOCUMENTS

| | | | |
|---|---|---|---|
| 7,670,184 B2 * | 3/2010 | Akahori ................. | H05K 7/026 439/949 |
| 2005/0227542 A1 | 10/2005 | Fukushima et al. | |
| 2008/0110662 A1 * | 5/2008 | Akahori ................. | H02G 3/086 174/59 |
| 2014/0335724 A1 * | 11/2014 | Kaneko .................. | H05K 7/026 439/527 |
| 2016/0020536 A1 | 1/2016 | Tashiro et al. | |
| 2016/0315458 A1 | 10/2016 | Kamo | |

(Continued)

FOREIGN PATENT DOCUMENTS

| | | | |
|---|---|---|---|
| JP | 2007-330054 A | 12/2007 | |
| JP | 2008-123928 A | 5/2008 | |

(Continued)

*Primary Examiner* — Timothy J Thompson
*Assistant Examiner* — Michael F McAllister
(74) *Attorney, Agent, or Firm* — Kenealy Vaidya LLP

(57) ABSTRACT

An electric connection box includes: an insulating casing; at least one internal electric part that is accommodated inside the casing and is electrically connected to a plurality of internal electric wires drawn from the inside to the outside of the casing; and a terminal block that is provided with at least one external electric part electrically connected to at least one external electric wire and is assembled into the casing outside the casing. The casing includes an accommodation member that accommodates the internal electric part, and a removable member that is attached to and detached from the accommodation member. The terminal block includes a holding member that holds the external electric part. The holding member is formed as one part integrated with the removable member.

11 Claims, 13 Drawing Sheets

(56) References Cited

U.S. PATENT DOCUMENTS

| | | | | |
|---|---|---|---|---|
| 2016/0351368 A1* | 12/2016 | Ikeda | ............ | H01H 85/20 |
| 2017/0305370 A1* | 10/2017 | Yamashita | ............ | H02G 3/083 |
| 2018/0309279 A1 | 10/2018 | Kakimi et al. | | |

FOREIGN PATENT DOCUMENTS

| | | |
|---|---|---|
| JP | 2013-34284 A | 2/2013 |
| JP | 2015-79652 A | 4/2015 |
| JP | 2015-126543 A | 7/2015 |
| JP | 2019-88126 A | 6/2019 |

\* cited by examiner

ELECTRIC CONNECTION BOX AND WIRE HARNESS

CROSS-REFERENCE TO RELATED APPLICATION(S)

The present application claims priority to and incorporates by reference the entire contents of Japanese Patent Application No. 2019-220115 filed in Japan on Dec. 5, 2019.

BACKGROUND OF THE INVENTION

1. Field of the Invention

The present invention relates to an electric connection box and a wire harness.

2. Description of the Related Art

Conventionally, in an electric connection box, a plurality of electric wires is electrically connected in a casing via electric parts such as electronic parts (relays and the like) and conductive parts (terminal fittings and the like), so that power is distributed between the electric wires and the electric wires are relayed. For example, the electric connection box is assembled into an installation target (vehicle such as an automobile). Japanese Patent Application Laid-open No. 2015-126543 discloses this type of electric connection box.

Incidentally, in the electric connection box, in a case where the electric parts required at a predetermined work such as an emergency response or a maintenance work are accommodated in the casing, when the electric parts are used, a worker should remove a cover of the casing. Therefore, conventionally, the electric parts are disposed outside the casing, so that workability during the predetermined work may be improved. However, when such a configuration is adopted, it is necessary not only to assemble the electric connection box and the electric wires drawn from the casing into the installation target, but also to assemble the electric parts for the predetermined work and the electric wires connected to the electric parts into the installation target. Therefore, this conventional configuration has room for improvement from the viewpoint of assembly workability at the time of manufacturing.

SUMMARY OF THE INVENTION

Therefore, an object of the present invention is to provide an electric connection box and a wire harness having excellent assembly workability.

In order to achieve the above object, an electric connection box according to one aspect of the present invention includes: an insulating casing; at least one internal electric part that is accommodated inside the casing and is electrically connected to a plurality of internal electric wires drawn from an inside to an outside of the casing; and a terminal block that is provided with at least one external electric part electrically connected to at least one external electric wire and is assembled into the casing outside the casing, wherein the casing includes an accommodation member that accommodates the internal electric part, and a removable member that is attached to and detached from the accommodation member, the terminal block includes a holding member that holds the external electric part, and the holding member is formed as one part integrated with the removable member.

According to another aspect of the present invention, in the electric connection box, it is preferable that the removable member is a cover that is attached to and detached from the accommodation member.

According to still another aspect of the present invention, in the electric connection box, it is preferable that the removable member is a side cover that closes a notch in the accommodation member and forms an outer wall of the accommodation member.

According to still another aspect of the present invention, in the electric connection box, it is preferable that the casing has a held portion that is attached to and held by a holding portion of a vehicle body, and the terminal block is disposed in a state of being more projected than the casing to a side of a variable portion according to an external input in an impact absorbing structure of the vehicle body.

According to still another aspect of the present invention, in the electric connection box, it is preferable that the external electric part is a relief terminal that supplies electricity to another vehicle.

Further, in order to achieve the above object, a wire harness according to still another aspect of the present invention includes: an insulating casing; a plurality of internal electric wires; at least one internal electric part that is accommodated inside the casing and is electrically connected to the plurality of internal electric wires drawn from the inside to the outside of the casing; at least one external electric wire; and a terminal block that is provided with at least one external electric part electrically connected to the at least one external electric wire and is assembled into the casing outside the casing, wherein the casing includes an accommodation member that accommodates the internal electric part, and a removable member that is attached to and detached from the accommodation member, the terminal block includes a holding member that holds the external electric part, and the holding member is formed as one part integrated with the removable member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of an electric connection box and a wire harness according to the present invention will be described in detail on the basis of the drawings. Note that the present invention is not limited by these embodiments.

Embodiment

One of the embodiments of the electric connection box and the wire harness according to the present invention will be described on the basis of FIGS. 1 to 13.

Figure 1:
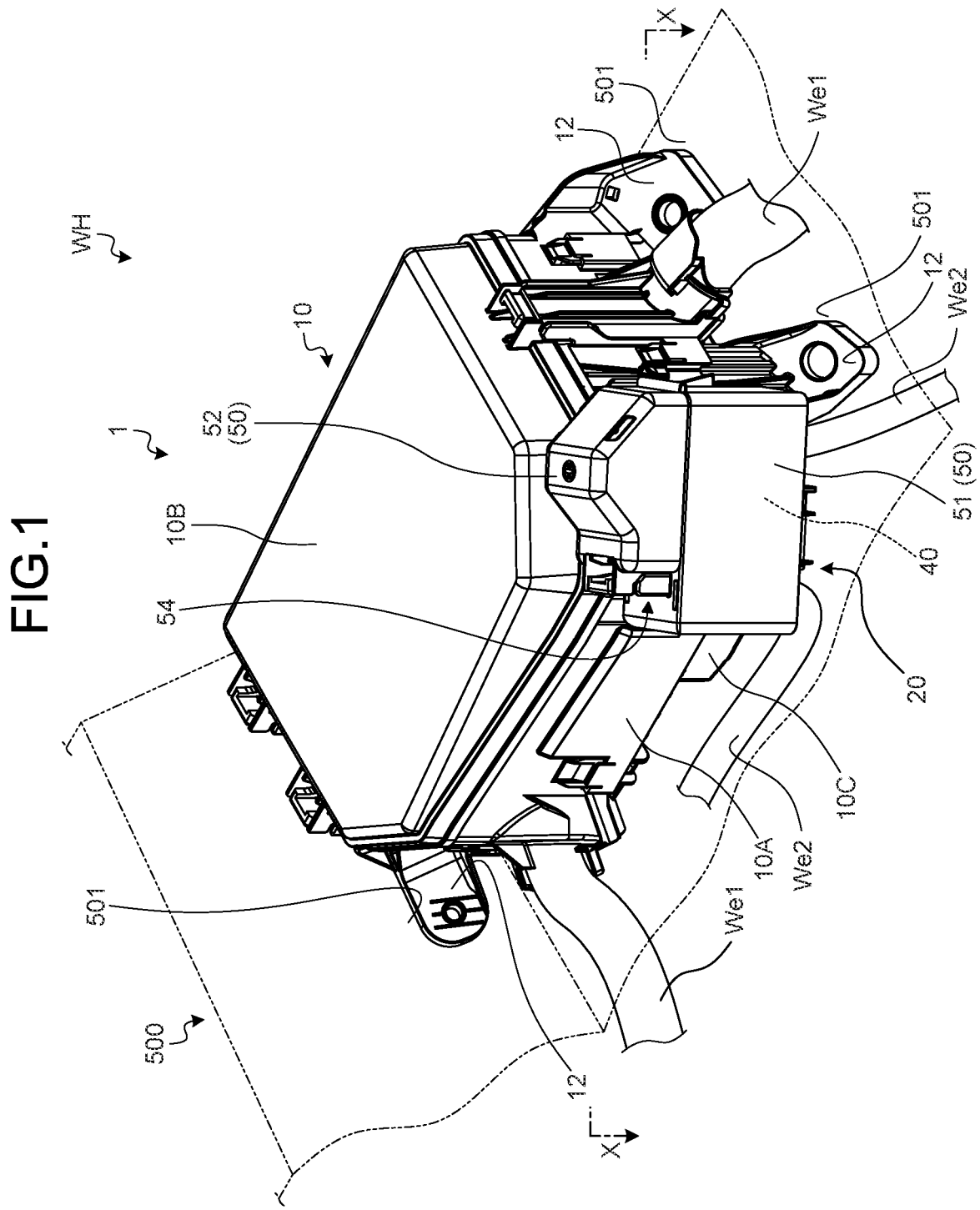
FIG. 1 is a perspective view illustrating an electric connection box and a wire harness according to an embodiment.
Figure 2:
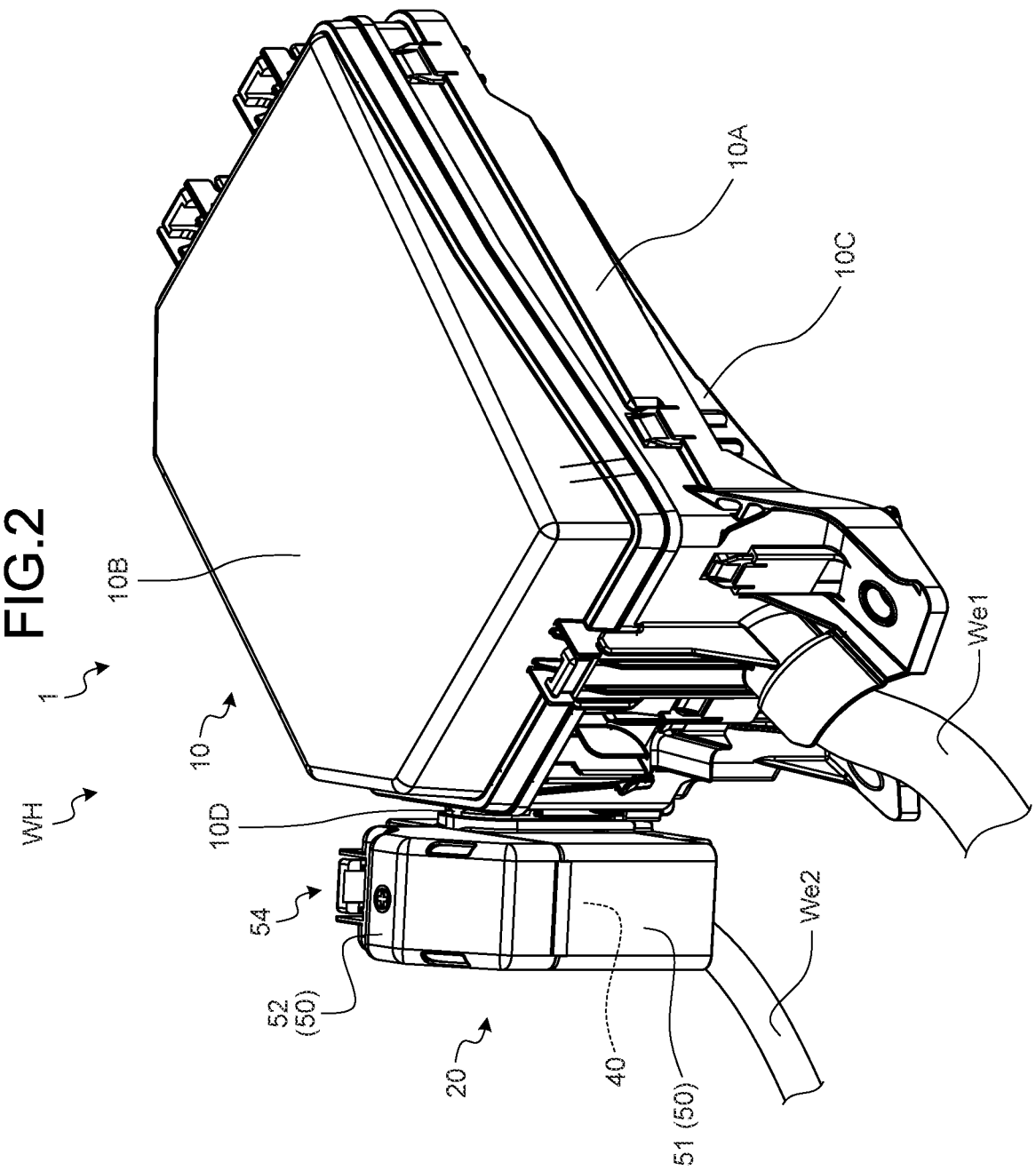
FIG. 2 is a perspective view of the electric connection box and the wire harness according to the embodiment as viewed from another angle.
Figure 3:
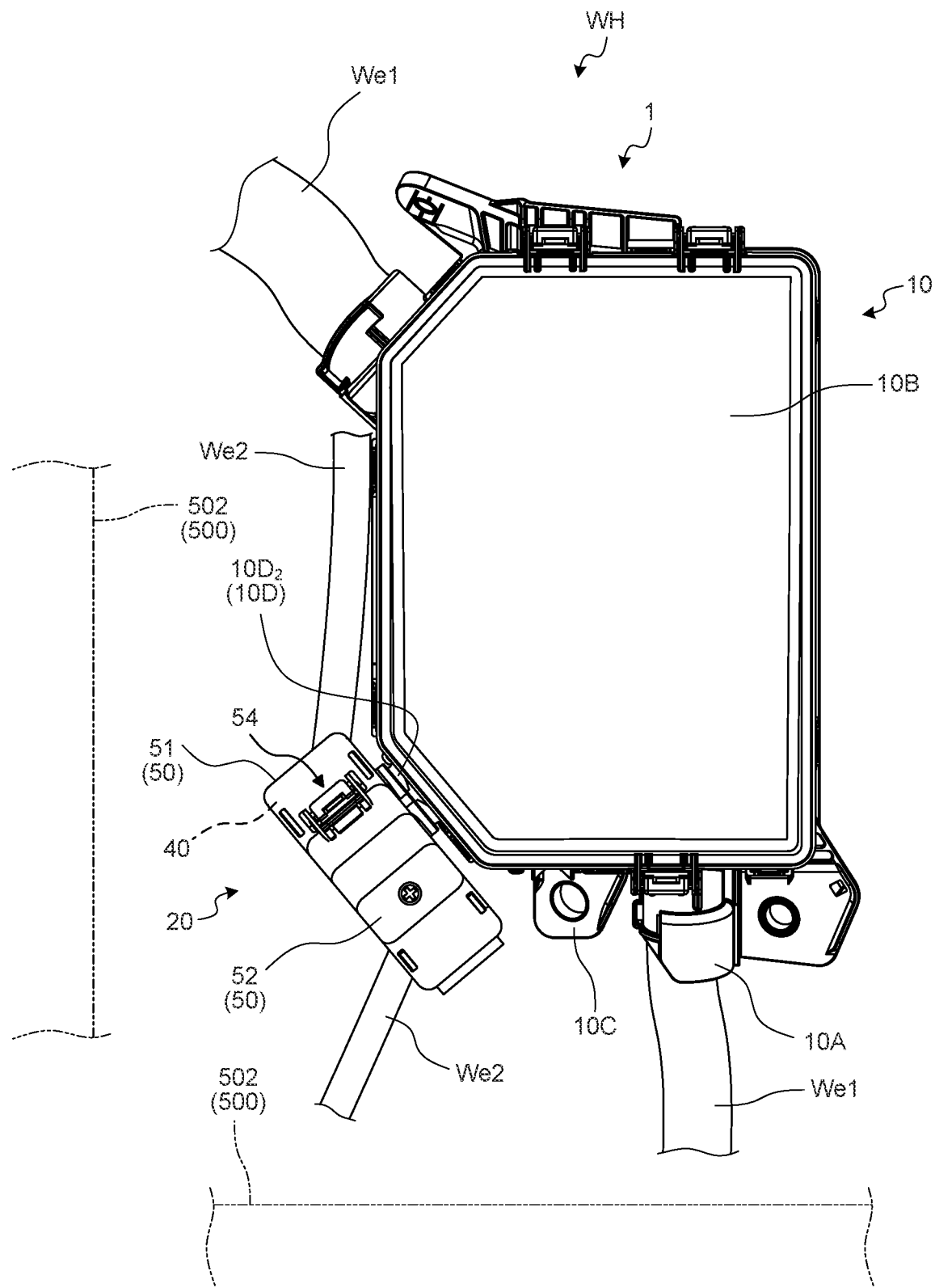
FIG. 3 is a plan view illustrating the electric connection box and the wire harness according to the embodiment as viewed vertically downward.

Reference numeral 1 in FIGS. 1 to 3 indicates an electric connection box of the present embodiment. Further, reference character WH in FIGS. 1 to 3 indicates a wire harness of the present embodiment including the electric connection box 1.

The electric connection box 1 of the present embodiment includes an insulating casing 10 and at least one electric part (hereinafter, referred to as "internal electric parts" (not illustrated)) accommodated inside the casing 10 (FIGS. 1 to 3). The internal electric parts are electrically connected to a plurality of electric wires (hereinafter, referred to as "internal electric wires") We1 inside the casing 10. The electric connection box 1 further includes a terminal block 20 disposed outside the casing 10 (FIGS. 1 to 12). The terminal block 20 is assembled into the casing 10 on the outside of the casing 10 (FIGS. 1 to 6). The terminal block 20 is provided with at least one electric part (hereinafter, referred to as an "external electric part") 30 electrically connected to at least one electric wire (hereinafter, referred to as an "external electric wire") We2 (FIGS. 9 to 12). The electric connection box 1 forms the wire harness WH together with the plurality of internal electric wires We1 drawn from the inside to the outside of the casing 10 and at least one external electric wire We2 drawn from the terminal block 20. Note that the internal electric wire We1 in the drawings shows a plurality of internal electric wires bundled with exterior parts (a corrugated tube and the like), a protective tape, or the like.

Here, the internal electric part and the external electric part 30 refer to an electronic part or a conductive part. The electronic part refers to, for example, a circuit protection part such as a relay or a fuse. Here, electronic devices such as a circuit board and an electronic control unit (so-called ECU) are also considered as a form of electronic parts. Further, the conductive part refers to a terminal fitting, a connector, a bus bar, or the like.

The internal electric part is electrically connected to a connection target via the internal electric wire We1 drawn to the outside of the casing 10. The connection target refers to a power supply such as a secondary battery, a load such as an electric device (an actuator or the like), a sensor, or the like. In the electric connection box 1 of this example, for example, a certain internal electric wire We1 is electrically connected to the power supply, and another internal electric wire We1 is electrically connected to the load, so that the power supply and the load are electrically connected via the internal electric part.

The casing 10 in which the internal electric parts are accommodated is formed of an insulating material such as a synthetic resin. The casing 10 of this example includes a cylindrical frame 10A that has both ends opened, a cover (hereinafter, referred to as a "first cover") 10B that closes one opening of the frame 10A, and a cover (hereinafter, referred to as a "second cover") 10C that closes the other opening of the frame 10A (FIGS. 1 to 6). In the casing 10, each of the first cover 10B and the second cover 10C is detachably assembled into the frame 10A via a lock mechanism (for example, it locks the two parties with locking claws or the like in an assembled state). In addition, in the casing 10, the internal electric parts are accommodated in an internal space surrounded by the frame 10A, the first cover 10B, and the second cover 10C in the assembled state, and the internal electric wires We1 electrically connected to the internal electric parts are drawn from the internal space to the outside. Note that, in the casing 10, the first cover 10B and the second cover 10C are removable members that can be attached to and detached from the frame 10A.

Incidentally, in the casing 10, the frame 10A has a function as an accommodation member for accommodating internal electric parts. In addition to the first cover 10B and the second cover 10C, the casing 10 of this example includes a removable member 10D that can be attached to and detached from the frame 10A (FIGS. 2, 3, 4, and 6).

Figure 4:
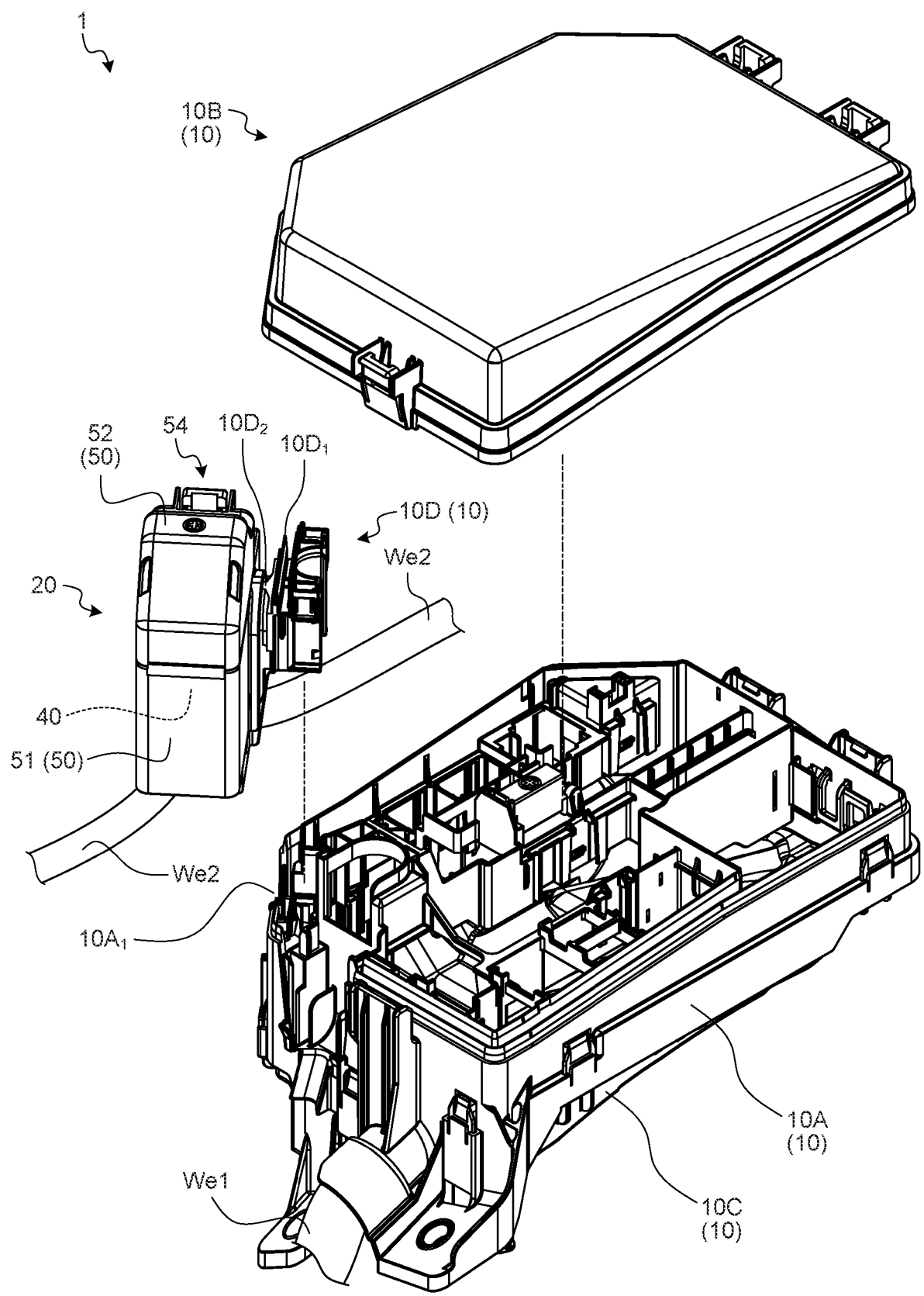
FIG. 4 is an exploded perspective view of the electric connection box with the side of a casing and the side of a terminal block separated.
Figure 5:
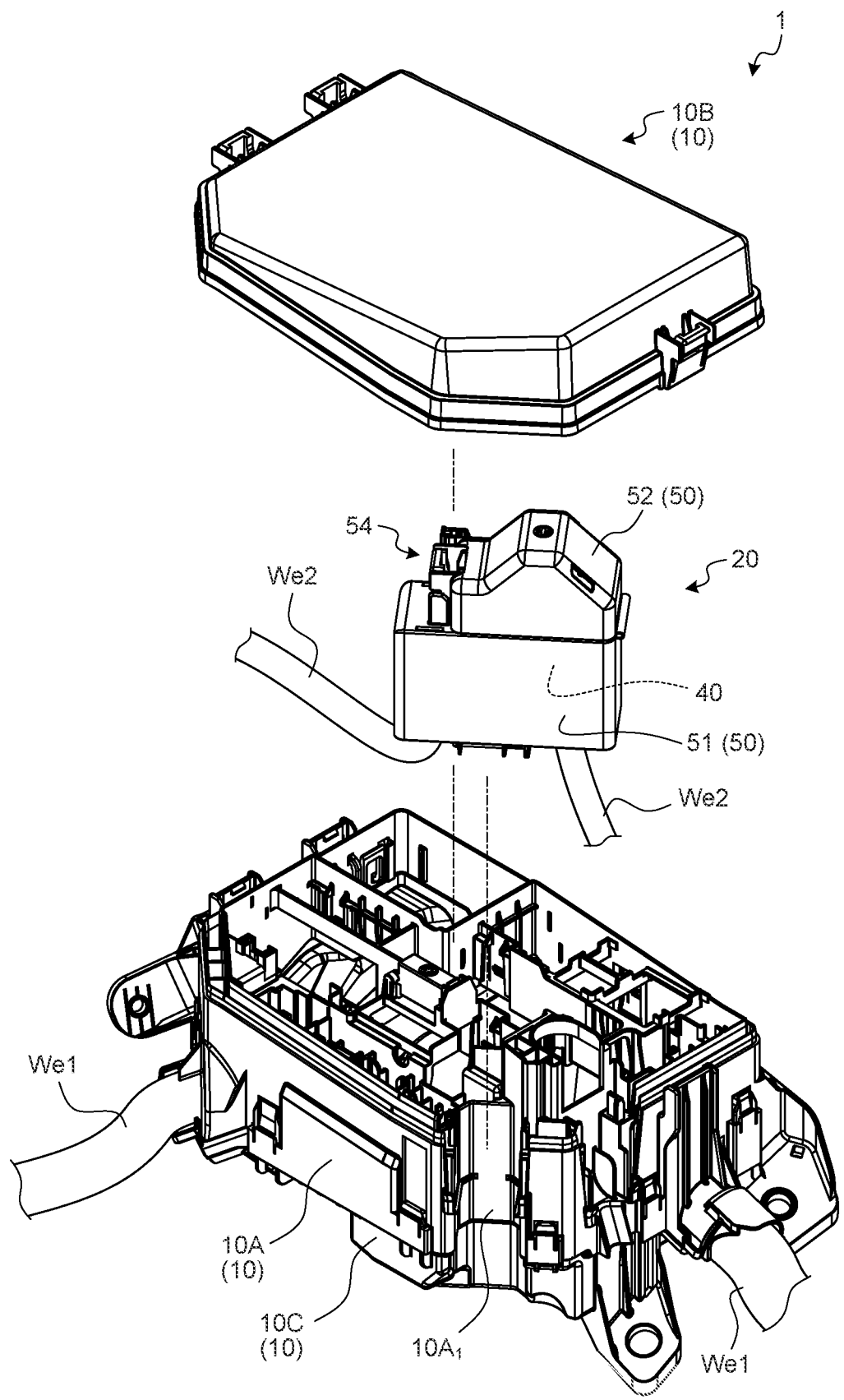
FIG. 5 is an exploded perspective view of the electric connection box with the side of the casing and the side of the terminal block separated, and is a front view of the side of a notch of an accommodation member.
Figure 6:
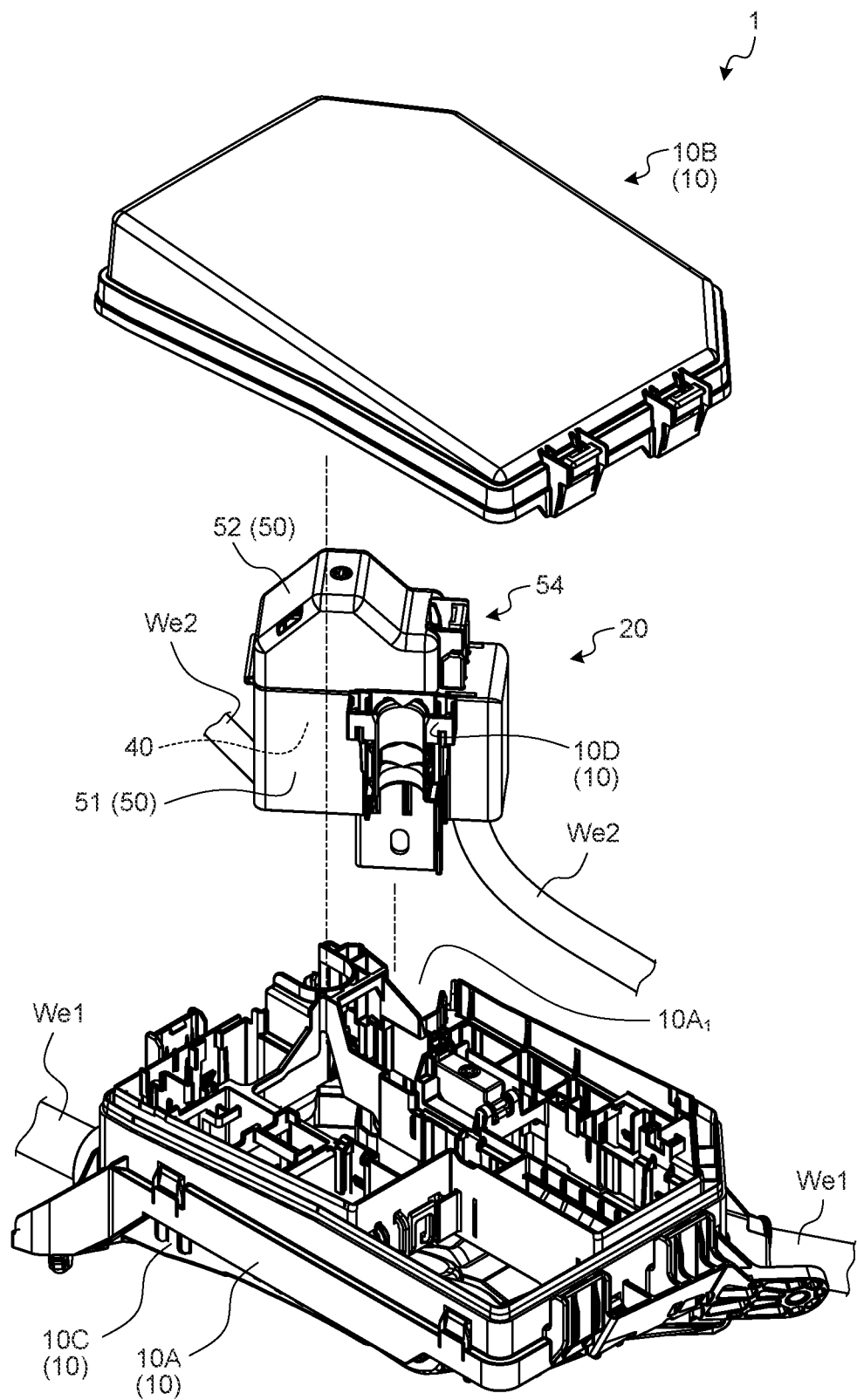
FIG. 6 is an exploded perspective view of the electric connection box with the side of the casing and the side of the terminal block separated, and is a front view of the side of a removable member of the terminal block.
Figure 7:
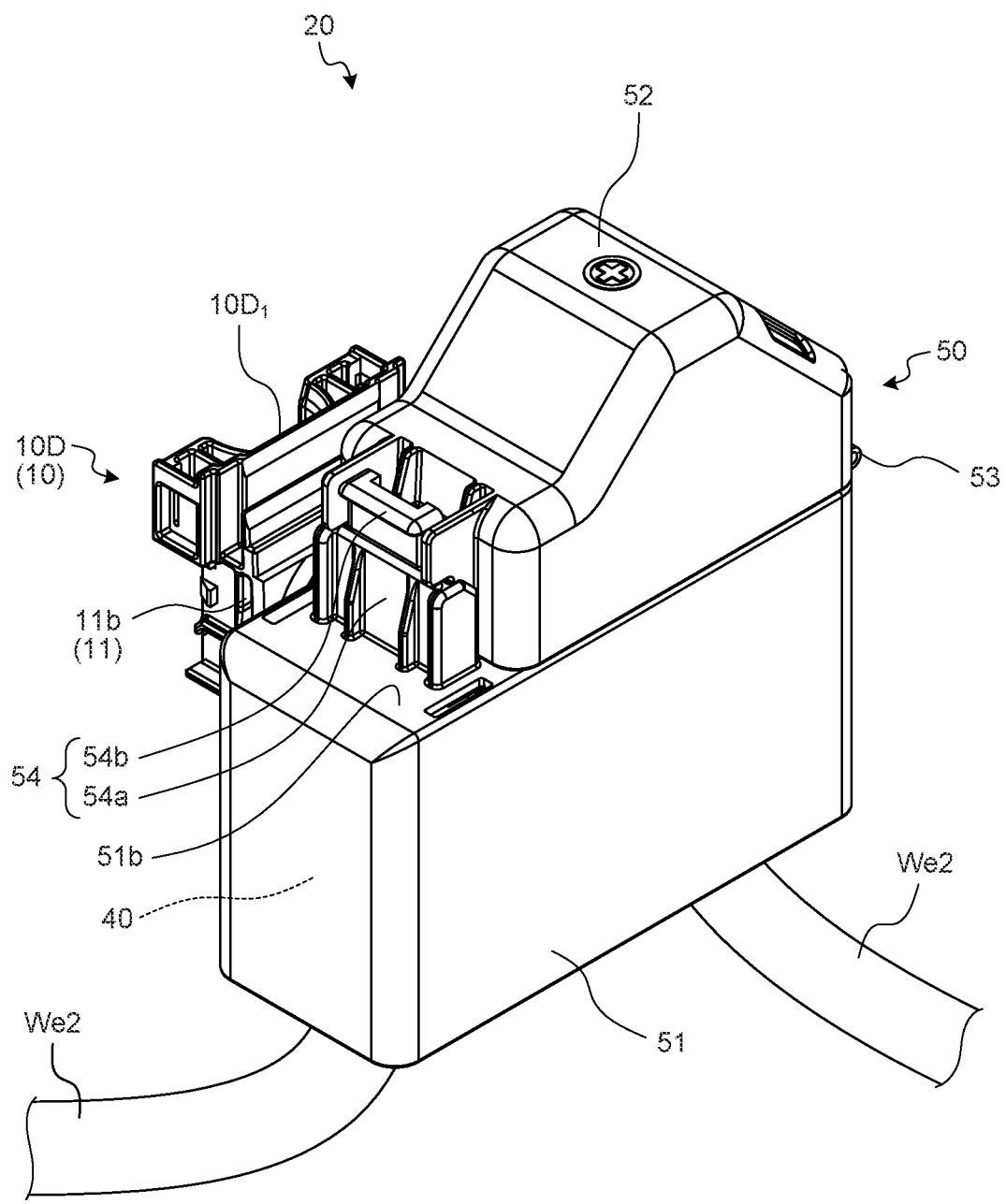
FIG. 7 is a perspective view illustrating an opened state of a second cover body in the terminal block.
Figure 8:
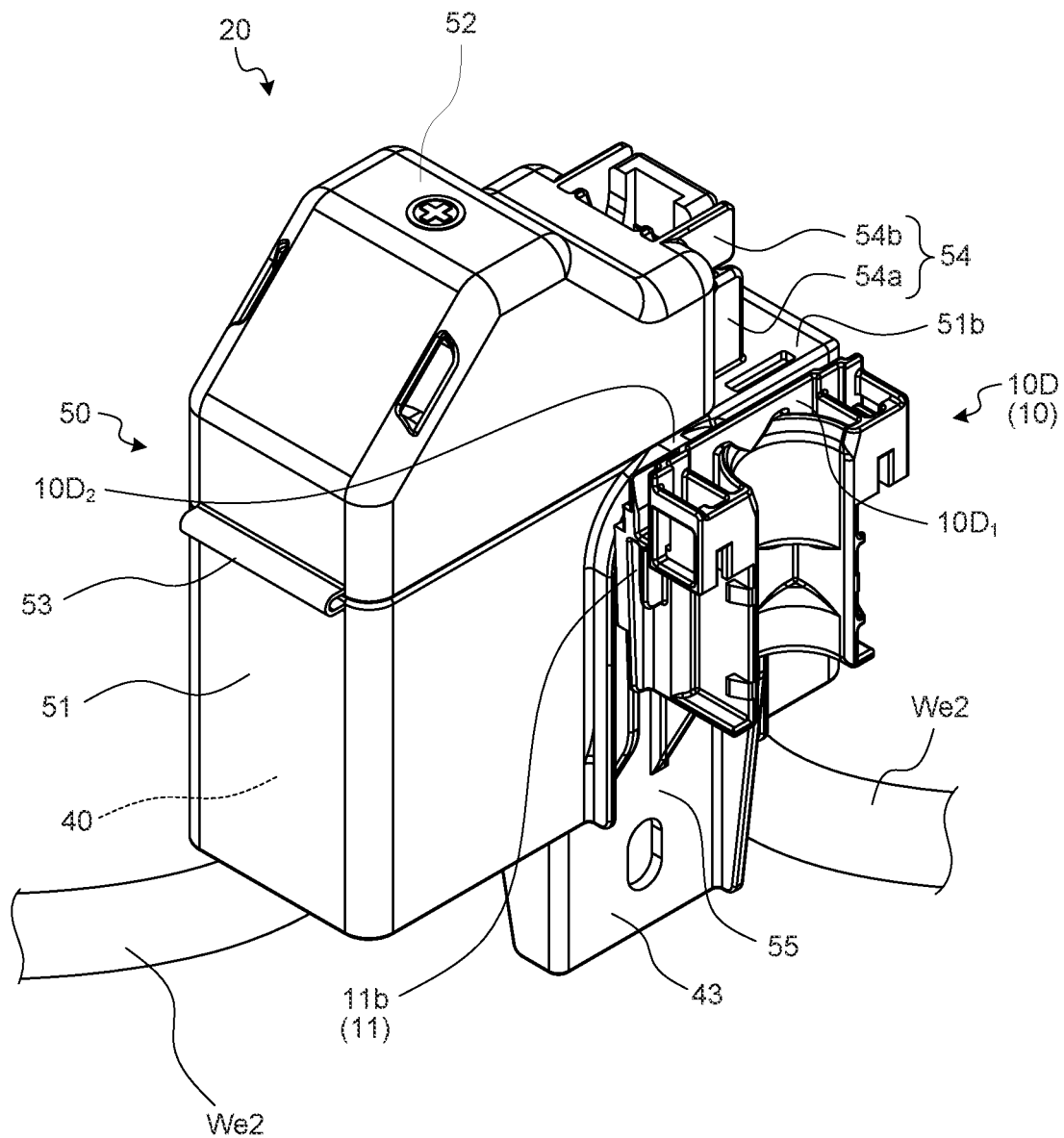
FIG. 8 is a perspective view of the opened state of the second cover body in the terminal block as viewed from another angle.

For example, the frame 10A illustrated here is provided with a notch $10A_1$ obtained by cutting a part of an outer wall (FIGS. 4 to 6). The notch $10A_1$ may cause the inside and the outside of the frames 10A to communicate with each other, and may be used when the internal electric parts inside the frame 10A are inspected, exchanged, or the like. Alternatively, the notch $10A_1$ may form an opening of a wiring path of the electric wire, and may be used when the electric wire is disposed. In the casing 10 illustrated here, the removable member 10D is assembled into the frame 10A in order to close the notch $10A_1$. That is, the removable member 10D illustrated here is formed as a cover that can be attached to and detached from the frame 10A. In this example, the casing 10 is mounted on a vehicle with each opening of the frame 10A oriented in a vertical direction. Therefore, the removable member 10D of this example is formed as a cover (hereinafter, referred to as a "side cover") that closes the notch $10A_1$ of the frame 10A and forms the outer wall of the frame 10A. Here, the notch $10A_1$ is formed in a rectangular shape. Therefore, the removable member 10D has a cover main body $10D_1$ with a rectangular plate shape that is matched. with the shape of the notch $10A_1$ (FIGS. 7 to 12). In the removable member 10D, the outer wall of the frame 10A is formed by the cover main body $10D_1$.

Figure 13:
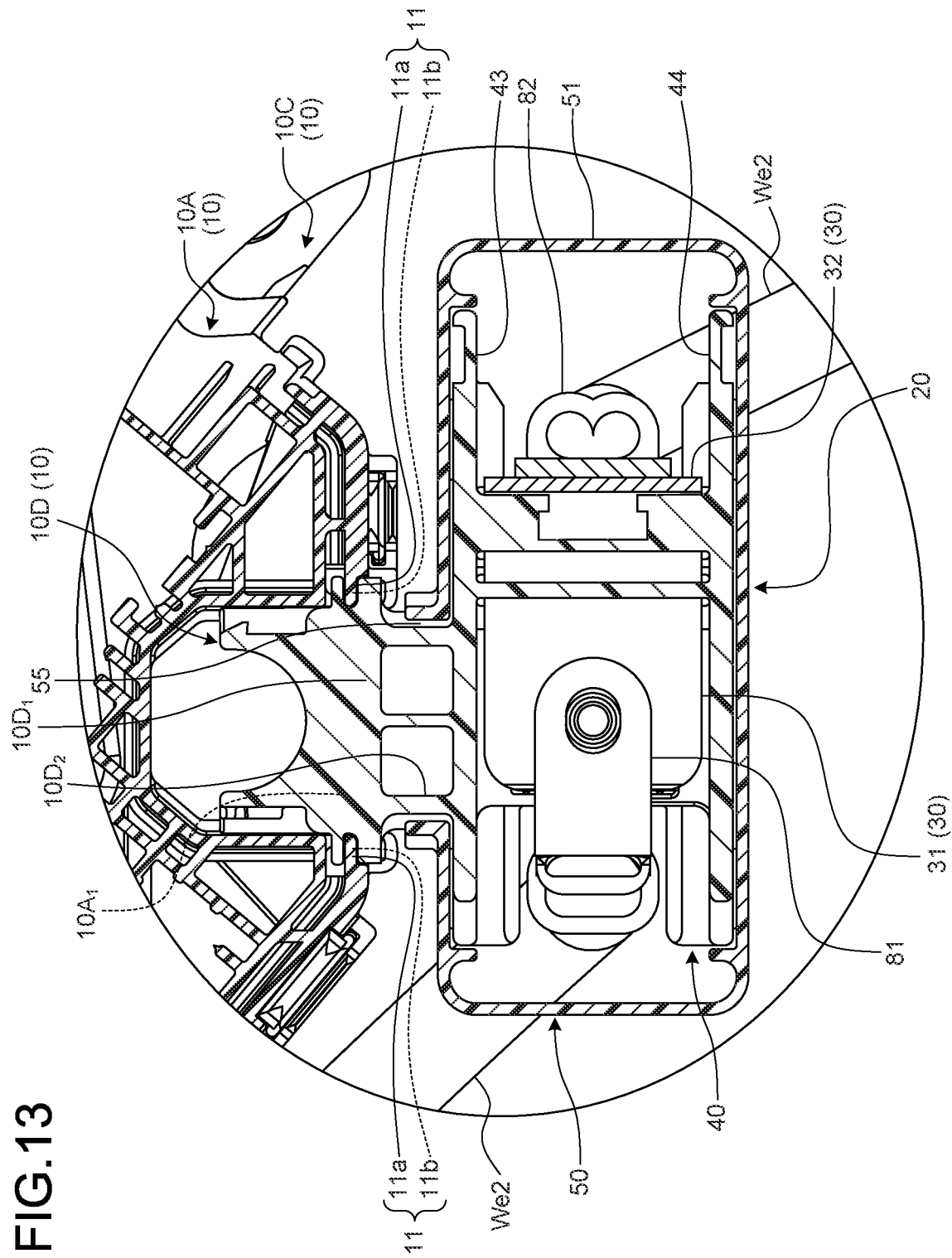
FIG. 13 is a cross-sectional view taken along line X-X of FIG. 1.

A removable structure between the frame 10A and the removable member 10D as the side cover may be of any form. Here, a known removable structure 11 in the technical field in which the frame 10A and the removable member 10D can be slid-fitted is mentioned as an example (FIG. 13). The removable structure 11 attaches/detaches the removable member 10D to/from the frame 10A while sliding the removable member 10D along a cylindrical axis direction of the frame 10A. The removable structure 11 includes a guide portion 11a formed on the frame 10A and a guided portion 11b formed on one side of the cover main body 10D₁ of the removable member 10D. In the removable structure 11, the removable member 10D is assembled into the frame 10A by sliding and fitting the guided portion 11b to the guide portion 11a along the cylindrical axis direction. The guide portion 11a is formed in a circumferential portion along the cylindrical axis direction of the notch 10A₁ in the frame 10A. In addition, the guided portion 11b is formed in a side portion along the cylindrical axis direction in an assembled state into the frame 10A, in the cover main body 10D₁. Here, the circumferential portion itself of the frame 10A is used as the guide portion 11a, and the guided portion 11b is formed in the side portion of the cover main body 10D₁ so as to fit the guide portion 11a in a shape of a groove extending in the cylindrical axis direction. The removable structure 11 illustrated here includes two pairs of guide portion 11a and guided portion 11b.

The casing 10 has a held portion 12 that is attached to and held by a holding portion 501 of an installation target 500 (FIG. 1). In the casing 10 of this example, the first cover 10B is disposed vertically above the frame 10A, and the second cover 10C is disposed vertically below the frame 10A. For example, the held portion 12 is provided in the second cover 10C and is attached to the holding portion 501 of the vertically lower side in the installation target 500. The installation target 500 illustrated here is a structure of a vehicle body in a vehicle such as an automobile. For example, the electric connection box 1 is installed in an engine compartment of the vehicle body.

On the other hand, the terminal block 20 may accommodate the external electric part 30 inside a casing (different from the casing 10), and may cause a holding member such as a so-called block to hold the external electric part 30. For example, the external electric part 30 illustrated here refers to an electric part for a predetermined work required at the predetermined work such as an emergency response or a maintenance work. Here, as the external electric part 30, a relief terminal for supplying electricity to another vehicle is mentioned as an example, and one external electric wire We2 drawn from the terminal block 20 is electrically connected to the power supply. Therefore, the terminal block 20 includes a holding member 40 that holds the external electric part 30 to be visually recognized by a worker, and a terminal cover 50 that covers the holding member 40 together with the relief terminal 30 from the outside (FIGS. 1 to 12).

Figure 11:
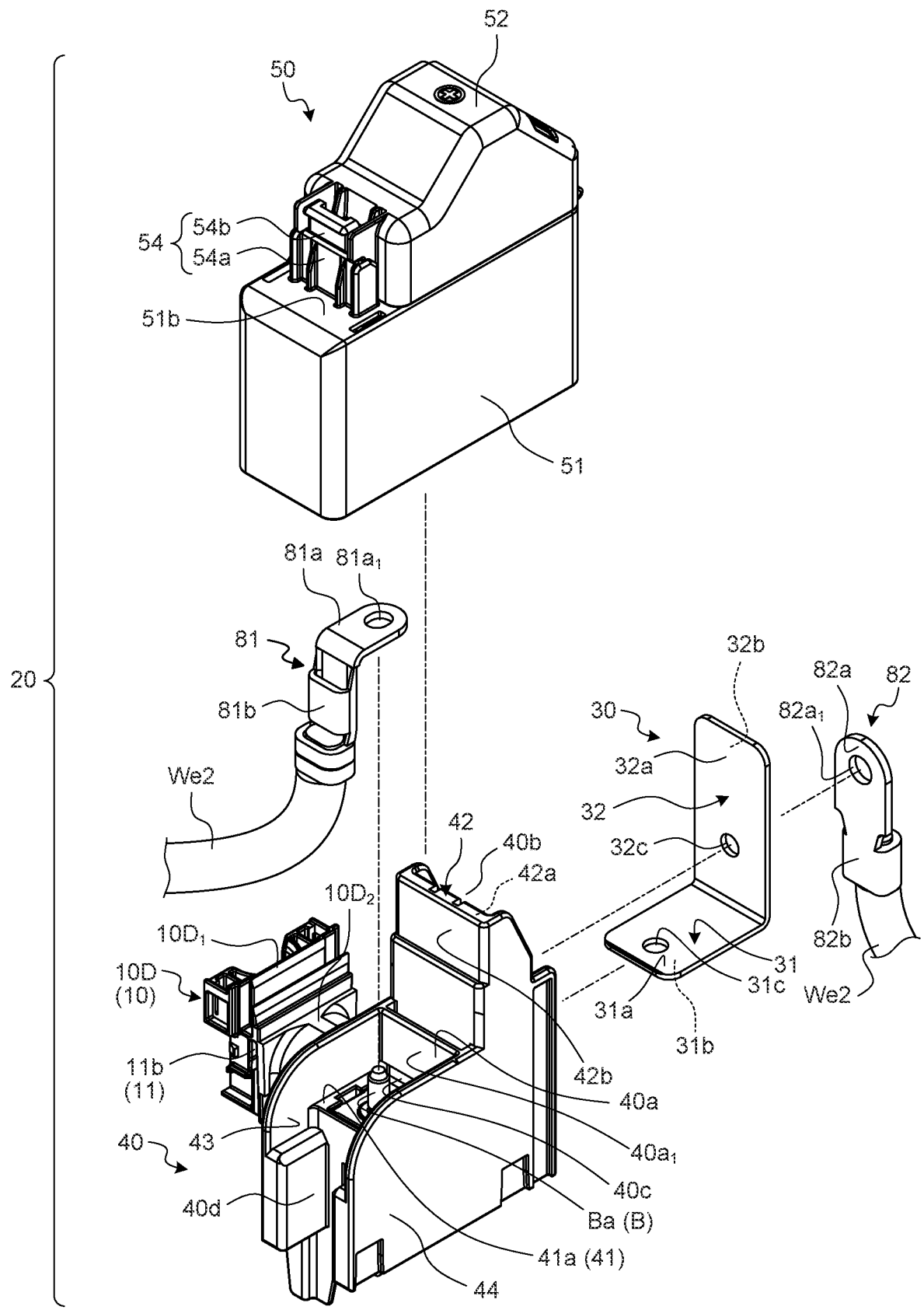
FIG. 11 is an exploded perspective view of the terminal block.
Figure 12:
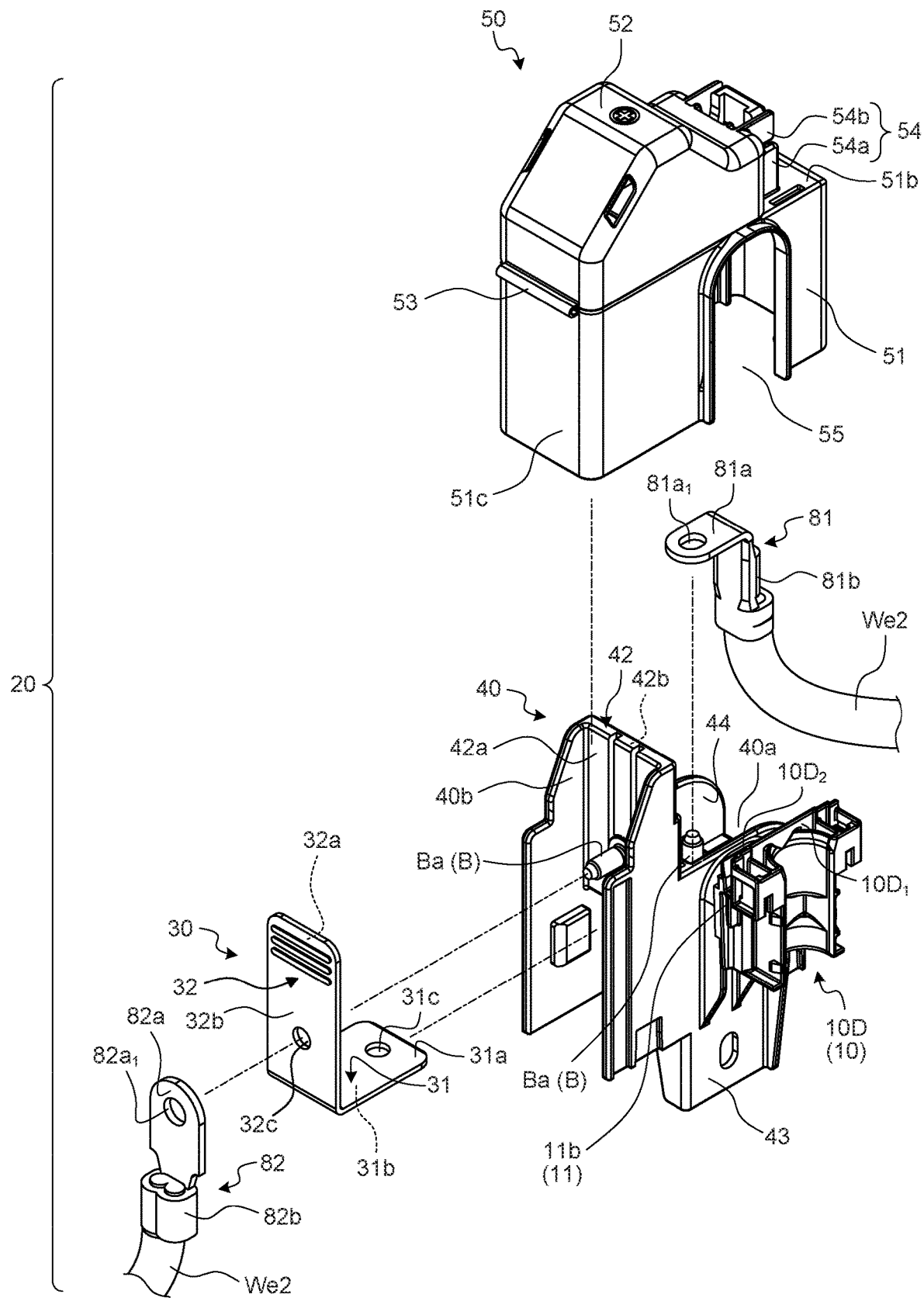
FIG. 12 is an exploded perspective view of the terminal block viewed from another angle.

In the relief terminal 30 illustrated here, a rectangular and slice-shaped first connector 31 and a rectangular and slice-shaped second connector 32 intersect with each other (FIGS. 11 and 12). The relief terminal 30 of this example is formed as an L-shaped terminal fitting in which the first connector 31 and the second connector 32 are caused to be orthogonal to each other. In the relief terminal 30, for convenience, the side sandwiched between the first connector 31 and the second connector 32 is referred to as the inside, and the side opposite to this is referred to as the outside. Therefore, in the relief terminal 30, the first connector 31 and the second connector 32 have rectangular inner wall surfaces 31a and 32a on the inside and rectangular outer wall surfaces 31b and 32b on the outside, respectively (FIGS. 11 and 12).

At least one external electric wire We2 is electrically connected to the relief terminal 30. In the relief terminal 30 of this example, one external electric wire We2 is electrically connected to each of the first connector 31 and the second connector 32. Here, a first terminal fitting 81 is physically and electrically connected to a terminal of one external electric wire We2, and a second terminal fitting 82 physically and electrically connected to a terminal of the other external electric wire We2 (FIGS. 11 and 12). In the relief terminal 30, one of the two external electric wires We2 is electrically connected to a power supply.

The first terminal fitting 81 of this example is an L-shaped terminal fitting in which slice-shaped first and second connectors 81a and 81b are caused to intersect with each other, and the terminal of the external electric wire We2 is crimped and fixed to the second connector 81b (FIGS. 11 and 12). The relief terminal 30 and the first terminal fitting 81 are physically and electrically connected by screwing and fixing the first connector 31 and the first connector 81a. Therefore, through-holes 31c and 81a₁ into which a male screw portion Ba of a male screw B is inserted are formed in the first connector 31 and the first connector 81a, respectively (FIGS. 11 and 12). Further, the second terminal fitting 82 of this example is a terminal fitting in which slice-shaped first and second connectors 82a and 82b are disposed in a linear shape, and the terminal of the external electric wire We2 is crimped and fixed to the second connector 82b (FIGS. 11 and 12). The relief terminal 30 and the second terminal fitting 82 are physically and electrically connected by screwing and fixing the second connector 32 and the first connector 82a. Therefore, through-holes 32c and 82a₁ into which a male screw portion Ba of a male screw B is inserted are formed in the second connector 32 and the first connector 82a, respectively (FIGS. 11 and 12). A female screw (not illustrated) is attached to each male screw B.

Further, in the relief terminal 30, the second connector 32 is sandwiched between clips (not illustrated) of a terminal of a booster cable, so that the second connector 32 is electrically connected to the booster cable.

The holding member 40 and the terminal cover 50 are formed of an insulating material such as synthetic resin. The terminal block 20 illustrated here is formed to accommodate the relief terminal 30 inside by the holding member 40 and the terminal cover 50 and to draw the external electric wire We2 from the inside to the outside. In the terminal block 20 of this example, the relief terminal 30, the first terminal fitting 81, and the second terminal fitting 82 are held by the holding member 40, and the relief terminal 30, the first terminal fitting 81, the second terminal fitting 82, and the holding member 40 are covered from the outside by the terminal cover 50.

The holding member 40 has a terminal installation portion 41 into which the outer wall surface 31b of the first connector 31 is assembled, and a clip installation portion 42 in which the inner wall surface 32a of the second connector 32 is disposed to face the clip installation portion 42 and which is sandwiched between the clips of the booster cable together with the second connector 32 (FIG. 11). In the holding member 40, the terminal installation portion 41 is formed as a bottom portion of a first concave portion 40a. Further, in the holding member 40, the clip installation portion 42 is formed in a projection state as a part of a bottom portion of a second concave portion 40b (FIGS. 11 and 12). The first concave portion 40a and the second concave portion 40b are formed so that the bottom portions thereof are orthogonal to each other.

The terminal installation portion 41 of this example has a terminal installation surface 41a on which the outer wall surface 31b of the first connector 31 is mounted (FIG. 11). A stud bolt as the male screw B is assembled into the terminal installation portion 41 with the male screw portion Ba projected from the terminal installation surface 41a. For example, in the terminal installation portion 41, the male screw B is assembled from the side opposite to the terminal installation surface 41a. Therefore, the terminal installation portion 41 is provided with, for example, a locking claw that hooks on a square head portion of the assembled male screw B and locks the head portion.

The clip installation portion 42 of this example is projected along a side wall $40a_1$ of the first concave portion 40a and toward the side of a free end of the male screw portion Ba, in a direction orthogonal to the terminal installation surface 41a of the terminal installation portion 41 (FIG. 11). The clip installation portion 42 is formed in a plate shape having a first wall surface 42a in which the inner wall surface 32a of the second connector 32 is disposed to face the first wall surface 42a, and a second wall surface 42b which is provided along the side wall $40a_1$ of the first concave portion 40a (FIGS. 11 and 12). The clips of the booster cable sandwich the second connector 32 and the clip installation portion 42 from the side of the outer wall surface 32b and the side of the second wall surface 42b. Further, a stud bolt as the male screw B is assembled into the clip installation portion 42 with the male screw portion Ba more projected than the first wall surface 42a (FIG. 12).

The side wall $40a_1$ of the first concave portion 40a is provided with a through-hole 40c into which the first connector 31 is inserted from the side of the first wall surface 42a to the side of the second wall surface 42b of the clip installation portion 42 (FIG. 11). In the holding member 40, by inserting the first connector 31 into the through-hole 40c from the side of the first wall surface 42a, the outer wall surface 31b of the first connector 31 is mounted on the terminal installation surface 41a of the terminal installation portion 41. When the first connector 31 is inserted into the through-hole 40c, the male screw portion Ba of the male screw B assembled into the clip installation portion 42 in advance is inserted into the through-hole 32c of the second connector 32. In the holding member 40, the male screw B is assembled into the terminal installation portion 41 from the side opposite to the terminal installation surface 41a, so that the male screw portion Ba is inserted into the through-hole 31c of the first connector 31. In this way, the relief terminal 30 of this example is installed in the holding member 40.

Then, the first terminal fitting 81 and the second terminal fitting 82 are connected to the relief terminal 30. For the first terminal fitting 81, the first connector 81a is mounted on the inner wall surface 31a of the first connector 31 while the male screw portion Ba of the male screw portion B assembled into the terminal installation portion 41 is inserted into the through-hole $81a_1$. In the holding member 40, the first connector 31 of the relief terminal 30 and the first connector 81a of the first terminal fitting 81 are screwed and fixed by screwing a female screw (not illustrated) into the male screw portion Ba. Further, for the second terminal fitting 82, the first connector 82a is disposed to face the outer wall surface 32b of the second connector 32 while the male screw portion Ba of the male screw portion B assembled into the clip installation portion 42 is inserted into the through-hole $82a_1$. In the holding member 40, the second connector 32 of the relief terminal 30 and the first connector 82a of the second terminal fitting 82 are screwed and fixed by screwing a female screw (not illustrated) into the male screw portion Ba.

The holding member 40 has a third concave portion 40d that is orthogonally connected to the first concave portion 40a (FIG. 11). In the holding member 40, the second connector 81b of the first terminal fitting 81 is disposed in the third concave portion 40d, so that one external electric wire We2 is disposed along the third concave portion 40d. Further, in the holding member 40, the second terminal fitting 82 is disposed in the second concave portion 40b, so that the other external electric wire het is disposed along the second concave portion 40b.

The holding member 40 has a first outer wall 43 and a second outer wall 44 that are disposed to face each other at intervals, sandwich the terminal installation portion 41 and the clip installation portion 42, and form side walls of the facing arrangement state in the first concave portion 40a, the second concave portion 40b, and the third concave portion 40d (FIGS. 11 and 12).

The terminal cover 50 is formed so as to cover the holding member 40 together with the relief terminal 30 and the first and second terminal fittings 81 and 82 from the side of the clip installation portion 42.

Figure 9:
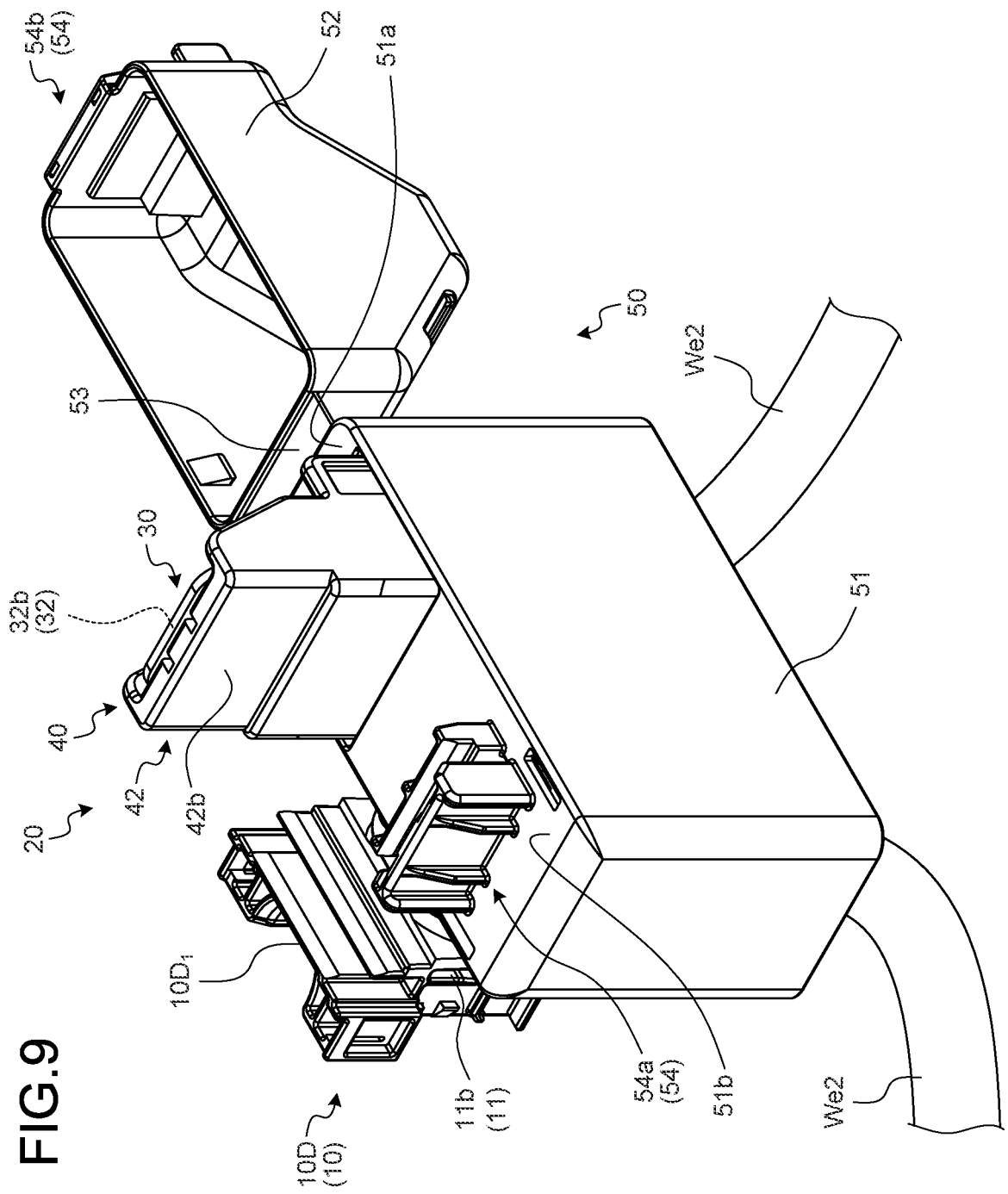
FIG. 9 is a perspective view illustrating the opened state of the second cover body in the terminal block.
Figure 10:
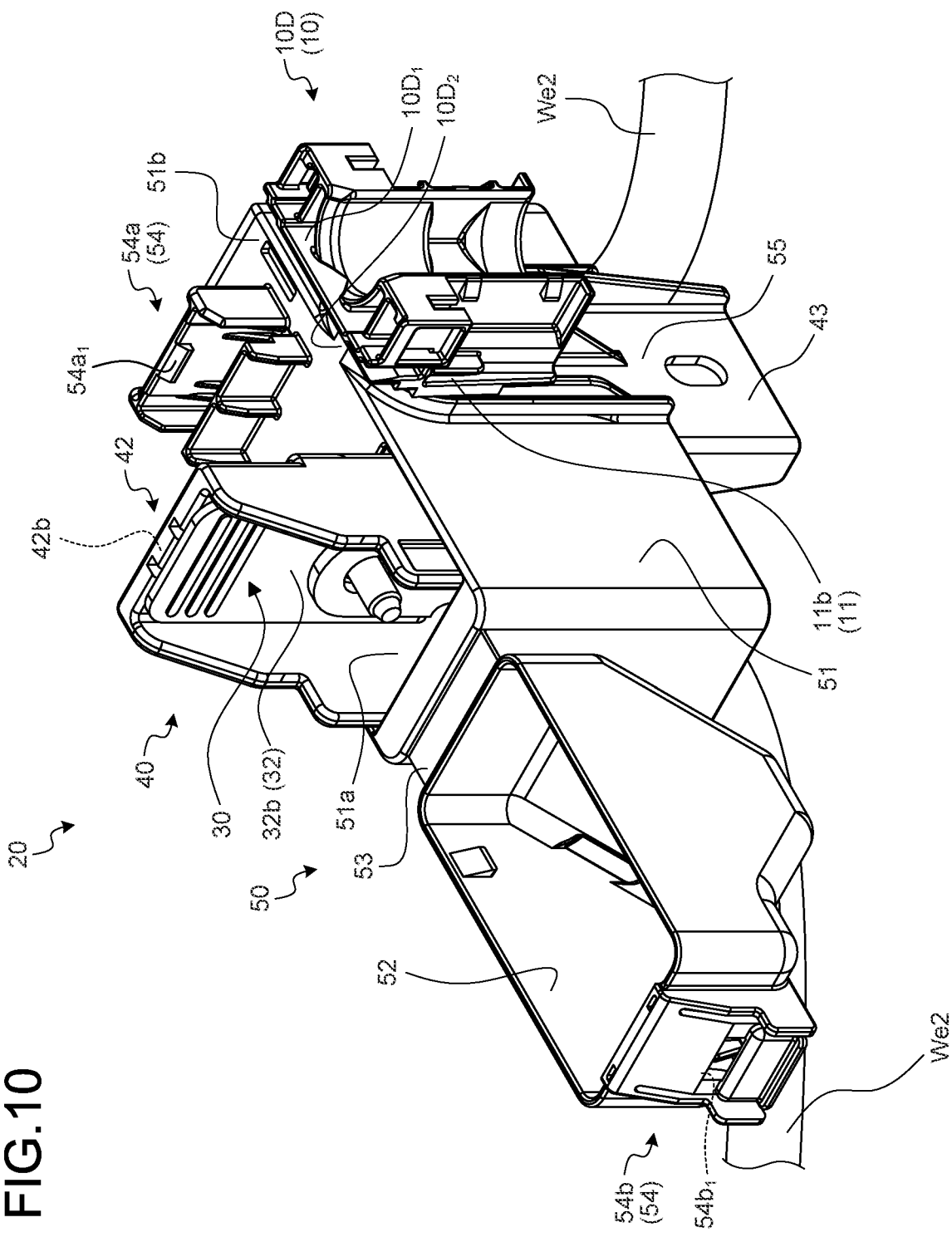
FIG. 10 is a perspective view of the opened state of the second cover body in the terminal block as viewed from another angle.

The terminal cover 50 of this example has a square cylindrical first cover body 51 with one end opened, and accommodates the holding member 40 from the opening (FIGS. 11 and 12). At the other end of the first cover body 51 in a cylindrical axis direction, a wall body 51b provided with a through-hole 51a is provided (FIGS. 9 and 10). The through-hole 51a is a hole into which the clip installation portion 42 and the second connector 32 of the relief terminal 30 are inserted, and the clip installation portion 42 and the second connector 32 are more projected than the wall body 51b in a state where the holding member 40 is accommodated.

The terminal cover 50 of this example has a second cover body 52 that at least closes the through-hole 51a of the wall body 51b and covers the clip installation portion 42 and the second connector 32 more projected than the wall body 51b (FIGS. 1 to 12). The second cover body 52 is formed in a square cylindrical shape with one end opened, and is attached to the first cover body 51 so as to be operable and closable. In the terminal cover 50 of this example, the first cover body 51 and the second cover body 52 are connected via a living hinge 53, and the second cover body 52 is rotated with respect to the first cover body 51 about the living hinge 53 (FIGS. 7 to 10). FIGS. 1 to 8 illustrate a closed state of the second cover body 52 with respect to the first cover body 51. FIGS. 9 and 10 illustrate an opened state of the second cover body 52 with respect to the first cover body 51.

The terminal cover 50 of this example includes a holding structure 54 that holds the second cover body 52 in a closed state with respect to the first cover body 51 (FIGS. 1 to 12). The holding structure 54 includes a first holding body 54a provided in the first cover body 51 and a second holding body 54b provided in the second cover body 52 (FIGS. 7 to 12). Here, the first holding body 54a is provided in a projection state with respect to the wall body 51b, and the second holding body 54b is provided in a projection state with respect to the outer wall surface of the second cover body 52. The first holding body 51a has a locking portion $54a_1$ (FIG. 10). On the other hand, the second holding body 54b has a locked portion $54b_1$ in which the relative movement toward the opened state at the position in the closed state is locked by the locking portion $54a_1$ (FIG. 10). One of the locking portion $54a_1$ and the locked portion $54b_1$ of this example is formed as a claw portion, and the other is formed as a locking wall for hooking the claw portion. Here, the locking portion $54a_1$ is formed as the claw portion, and the locked portion $54b_1$ is formed as the locking wall.

As illustrated above, the terminal block 20 is assembled into the casing 10 on the outside of the casing 10. In the electric connection box 1, the holding member 40 of the terminal block 20 is integrated with one of the components forming the casing 10 in order to improve the workability of assembling the terminal block 20 into the casing 10. Specifically, the holding member 40 is formed as one part integrated with the removable member forming the casing 10. The removable member illustrated here may be one of the first cover 10B, the second cover 10C, and the side cover (removable member 10D) illustrated above. In addition to these various covers, any removable member that can be attached to and detached from the frame 10A as the accommodation member may be used. In this example, the removable member 10D as the side cover and the holding member 40 are formed as one part (FIGS. 7 to 13).

The removable member 10D of this example has a connecting portion $10D_2$ projected from the outer wall surface of the cover main body $10D^1$, and is connected to the outer wall surface of the first outer wall 43 of the holding member 40 via the connecting portion $10D_2$ (FIGS. 8 and 10 to 13). In addition, the first cover body 51 of the terminal cover 50 of this example is provided with a notch 55 for avoiding the connecting portion $10D_2$ (FIGS. 8, 10, 12, and 13).

In the electric connection box 1, the removable member 10D as the side cover is assembled into the frame 10A before the first cover 10B is assembled into the frame 10A. Therefore, in the electric connection box 1 of the present embodiment, the removable member 10D is assembled into the frame 10A, so that the holding member 40 of the terminal block 20 is also assembled into the frame 10A. For example, in the terminal block 20, after the relief terminal 30, the first terminal fitting 81, and the second terminal fitting 82 are assembled into the holding member 40 in advance, the terminal cover 50 can be assembled into the holding member 40. Therefore, in the electric connection box 1, the removable member 10D is assembled into the frame 10A, so that the terminal block 20 including the relief terminal 30 and the like is assembled into the frame 10A. As described above, in the electric connection box 1 of the present embodiment, even if an assembly process of the terminal block 20 into the casing 10 is not separately provided, the assembly process is included in an assembly process of the removable member 10D into the frame 10A, so that the removable member 10D and the terminal block 20 can be assembled into the frame 10A at the same time. Therefore, in the electric connection box 1, the terminal block 20 can be assembled into the casing 10 with excellent assembly workability. Since the wire harness WH of the present embodiment includes the electric connection box 1, it is possible to achieve a useful effect obtained by the electric connection box 1.

Here, in the conventional electric connection box and wire harness, the relief terminal is accommodated in the casing together with the terminal cover as the internal electric part. For this reason, in the conventional electric connection box and wire harness, when the relief terminal is used, it is necessary to remove the first cover of the casing and remove the second cover body of the terminal cover from the first cover body. However, in the electric connection box 1 and the wire harness WH of the present embodiment, the relief terminal 30 can be accessed only by opening the second cover body 52 of the terminal cover 50. Therefore, the electric connection box 1 and the wire harness WH can also improve the workability at the time of an emergency response.

Further, in the electric connection box 1 and the wire harness WH of the present embodiment, since the relief terminal 30 is disposed outside the casing 10, the external electric wire We2 connected to the relief terminal 30 is also disposed outside the casing 10. Therefore, if the volume of the internal space of the casing 10 is the same, the electric connection box 1 and the wire harness WH have an empty space corresponding to the external electric wire We2, so that the accommodation capacity of the parts for the casing 10 can be improved. From another viewpoint, the electric connection box 1 and the wire harness WH can reduce the volume of the internal space of the casing 10 corresponding to the external electric wire We2, so that the size of the casing 10 can be reduced.

Further, in the electric connection box 1 and the wire harness WH of the present embodiment, the second cover body 52 of the terminal cover 50 is connected to the first cover body 51 via the living hinge 53. Therefore, the electric connection box 1 and the wire harness WH obtain a cost reduction effect by reducing the number of parts as compared with the conventional case. In addition, since the electric connection box 1 and the wire harness WH do not require a work such as searching for a position of the removed second cover body as in the conventional case, it is possible to improve workability at the time of the emergency response.

Incidentally, in the electric connection box 1, the terminal block 20 is preferably disposed in a state of being more projected than the casing 10 to the side of a variable portion 502 according to an external input in an impact absorbing structure of a vehicle body which is the installation target 500 (FIG. 3). The variable portion 502 is a part of the vehicle body deformed when the external input of the predetermined magnitude or more is applied in order to absorb the impact caused by the external input. Therefore, in the electric connection box 1 and the wire harness WH of the present embodiment, when the variable portion 502 is deformed by the external input and comes into contact with the electric connection box 1, the variable portion 502 can be first hit against the terminal block 20, so that the internal electric parts and the like in the casing 10 can be protected. In the electric connection box 1 of this example, the external electric part 30 provided in the terminal block 20 is an electric part for the emergency response or the maintenance work. Therefore, even if a problem occurs in the terminal block 20, there is no urgent need for a repair work.

In the electric connection box and the wire harness according to the present embodiment, the removable member is assembled into the accommodation member, so that the holding member of the terminal block is also assembled into the accommodation member. For example, in the terminal block, the external electric part and the external electric wire can be assembled into the holding member in advance. Therefore, in the electric connection box and the wire harness, the removable member is assembled into the accommodation member, so that the terminal block including the external electric part and the like is assembled into the accommodation member. As described above, in the electric connection box and the wire harness according to the present embodiment, even if an assembly process of the terminal block into the casing is not separately provided, the assembly process is included in an assembly process of the removable member into the accommodation member, so that the removable member and the terminal block can be assembled into the accommodation member at the same time. Therefore, in the electric connection box and the wire harness, the terminal block can be assembled into the casing with excellent assembly workability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric connection box comprising:
an insulating casing;
at least one internal electric part that is accommodated. inside the casing and is electrically connected to a plurality of internal electric wires drawn from an inside to an outside of the casing; and
a terminal block that is provided with at least one external electric part electrically connected to at least one external electric wire and is assembled into the casing outside the casing, wherein
the casing includes an accommodation member that accommodates the internal electric part, and a removable member that is attached to and detached from the accommodation member,
the terminal block includes a holding member that holds the external electric part, and
the holding member is formed as one part integrated with the removable member.

2. The electric connection box according to claim wherein
the removable member is a cover that is attached to and detached from the accommodation member.

3. The electric connection box according to claim 1, wherein
the removable member is a side cover that closes a notch in the accommodation member and forms an outer wall of the accommodation member.

4. The electric connection box according to claim 1, wherein
the casing has a held portion that is attached to and held by a holding portion of a vehicle body, and
the terminal block is disposed in a state of being more projected than the casing to a side of a variable portion according to an external input in an impact absorbing structure of the vehicle body.

5. The electric connection box according to claim 2, wherein
the casing has a held portion that is attached to and held by a holding portion of a vehicle body, and
the terminal block is disposed in a state of being more projected than the casing to a side of a variable portion according to an external input in an impact absorbing structure of the vehicle body.

6. The electric connection box according to claim 3, wherein
the casing has a held portion that is attached to and held by a holding portion of a vehicle body, and
the terminal block is disposed in a state of being more projected than the casing to a side of a variable portion. according to an external input in an impact absorbing structure of the vehicle body.

7. The electric connection box according to claim 1, wherein
the external electric part is a relief terminal that supplies electricity to another vehicle.

8. The electric connection box according to claim 2, wherein
the external electric part is a relief terminal that supplies electricity to another vehicle.

9. The electric connection box according to claim 3, wherein
the external electric part is a relief terminal that supplies electricity to another vehicle.

10. The electric connection box according to claim 4, wherein
the external electric part is a relief terminal that supplies electricity to another vehicle.

11. A wire harness comprising:
an insulating casing;
a plurality of internal electric wires;
at least one internal electric part that is accommodated inside the casing and is electrically connected to the plurality of internal electric wires drawn from an inside to an outside of the casing;
at least one external electric wire; and
a terminal block that is provided with at least one external electric part electrically connected to the at least one external electric wire and is assembled into the casing outside the casing, wherein
the casing includes an accommodation member that accommodates the internal electric part, and a removable member that is attached to and detached from the accommodation member,
the terminal block includes a holding member that holds the external electric part, and
the holding member is formed as one part integrated with the removable member.

* * * * *